Figure 1:
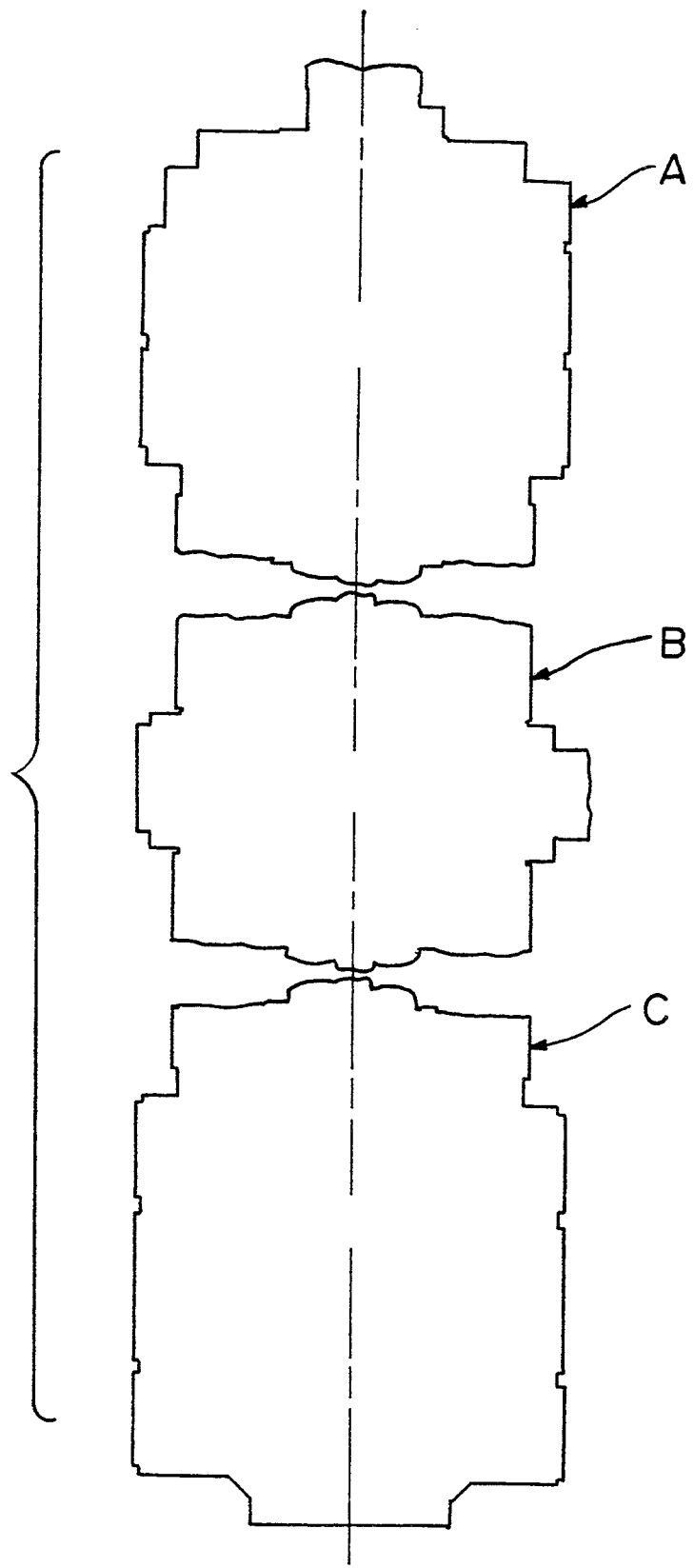

United States Patent [19]

Blach

[11] Patent Number: 5,393,140
[45] Date of Patent: Feb. 28, 1995

[54] APPARATUS FOR CONTINUOUSLY PROCESSING VISCOUS LIQUIDS AND MASSES

[76] Inventor: Josef A. Blach, A-5310 Mondsee, Austria

[21] Appl. No.: 238,588
[22] Filed: May 5, 1994
[30] Foreign Application Priority Data May 7, 1993 [AT] Austria ................... 897/93

[51] Int. Cl.⁶ ..................... B29B 1/10; B01F 15/02
[52] U.S. Cl. ................... 366/75; 366/76; 366/139; 366/146; 366/301; 264/102; 425/204
[58] Field of Search ............ 366/75, 76, 77, 83, 366/84, 85, 139, 144, 146, 297, 298, 299, 301; 264/101, 103, 349; 425/204, 208, 207

[56] References Cited

U.S. PATENT DOCUMENTS

| | | | |
|---|---|---|---|
| 3,407,046 | 10/1968 | Massoubre | 366/297 |
| 4,268,176 | 5/1981 | Muller | 366/83 |
| 4,591,487 | 5/1986 | Fritsch . | |
| 5,020,916 | 6/1991 | Fritsch . | |
| 5,106,198 | 4/1992 | Muller | 425/204 |
| 5,108,711 | 4/1992 | Chszaniecki | 425/204 |

FOREIGN PATENT DOCUMENTS

3030541 C2 11/1982 Germany .
3430885 C2 8/1986 Germany .
4001986 C1 9/1991 Germany .

Primary Examiner—Robert W. Jenkins
Attorney, Agent, or Firm—Flynn, Thiel, Boutell & Tanis

[57] ABSTRACT

An apparatus for continuously processing viscous liquids and masses has axially parallel satellite shafts (23) disposed in a ring within a housing (4) which bear meshing processing means (24) and are driven by a central shaft (17) via pinions (28, 29) on the inlet side to perform a common revolving motion about the central shaft (17). The pinions (28, 29) have associated therewith a distributing plate (60) which is provided with through bores (61) for the satellite shafts (23) and has an annular groove (63) opening toward the inlet side, from which channels (64) lead into the area of the processing means (24) on the satellite shafts which is located on the thick-layer side of the satellite shafts (23) facing away from the enveloping housing (1).

11 Claims, 12 Drawing Sheets

APPARATUS FOR CONTINUOUSLY PROCESSING VISCOUS LIQUIDS AND MASSES

The present invention relates to an apparatus for continuously processing viscous liquids and masses, in particular molten plastic masses and high-molecular polymers, having a number of axially parallel satellite shafts disposed in a ring within a housing and driven in the same direction via associated pinions, said shafts bearing processing means engaging each other on adjacent satellite shafts and spreading the material to be processed in a thin layer in certain areas, a central shaft disposed in the center of the space surrounded by the satellite shafts and driven axially parallel to the satellite shafts, said central shaft bearing at least one driving gear so as to rotate therewith, the satellite shafts being coupled in geared fashion via their pinions with the central driving gear and with the internal toothing of at least one annular gear fixed on the housing in such a way that when the central shaft rotates the satellite shafts perform a common revolving motion about the central shaft, and feeding and removing means for introducing the material to be processed into the range of action of the processing means on the inlet side and removing it therefrom on the outlet side.

So-called thin-layer multishaft reactors have been developed for example for homogenizing and degassing high-molecular molten polymer masses (DE-C 3 030 541) that have the fundamental advantage over conventional so-called screw-type extruders that they make do with economically and technically realizable working lengths while having high degassing power even for long sojourn times of the material to be processed.

These known multishaft reactors work with a number of shafts disposed in a ring and bearing the processing tools for example in the form of kneading plates. The processing tools of adjacent shafts mesh with each other, the viscous material being spread into thin layers again and again when passing through the narrow gaps limited by the processing tools. Multishaft reactors of this design are therefore very efficient in terms of process engineering.

To ensure that the material to be processed is spread properly in thin layers the ring of satellite shafts is charged in controlled fashion with the material in a multishaft reactor of this type known from DE-C 3 430 885 in such a way that a thin layer forms on the inside rim when the outside rim is charged while a thin layer is produced on the outside rim when the inside rim is charged.

In another apparatus in the form of such a multishaft reactor known from DE-C 4 001 986, which is characterized by a simpler construction of the driving gear for the satellite shafts, the satellite shafts are charged with material to be processed on the outside rim in order to produce a thin layer on the inside rim. However the constructional conditions are such that the thick and thin layers are not properly separated so that the efficiency of this apparatus is not optimal either. In addition the apparatus works with a hollow drilled central driving shaft of reduced cross section which extends at a radial distance from the processing tools of the satellite shafts surrounding it. This means that the material to be processed can be deposited on the central shaft and lead to clogging of the vacuum pipes provided within the central shaft as well as to impairment and contamination of the material to be processed.

The invention is based on the problem of providing an apparatus of the type stated at the outset that remedies these disadvantages and is characterized by a simple structure while allowing proper formation of thin layers in the material to be processed thereby ensuring high efficiency.

To solve this problem the apparatus stated at the outset is characterized according to the invention in that the the satellite shafts have associated therewith, on the inlet side of the material to be processed, distributing means for the material which communicate with the feeding means and have, in the area of the processing means on all satellite shafts, guiding means for the material that open onto one side, the thick-layer side.

The thick-layer side is advantageously located on the side of the satellite shafts facing away from the enveloping housing so that the thin-layer side is located on the outside rim of the satellite shafts. The new apparatus is characterized by proper separation between the thick- and thin-layer sides because it ensures an exact feed of material to the treating means on the satellite shafts.

To prevent deposits from forming on the central shaft and/or the housing portion surrounding the satellite shafts the arrangement is expediently such that the central shaft or a member surrounding it is formed so as to extend radially as far as the processing means on the satellite shaft while, on the other hand, the treating means extend as far as a housing portion surrounding them in such a way that there are only narrow working gaps between the treating means and the central shaft or surrounding housing portion. This ensures that both the central shaft or the member surrounding it and the inside wall of the housing portion surrounding the satellite shafts are constantly scraped.

The distributing means expediently have a distributing plate inserted after the pinions on the inlet side, said plate being provided with through bores for the satellite shafts and having the guiding means formed thereon. This distributing plate can have at least one annular groove opening toward the inlet side and communicating with the feeding means, with channels forming the guiding means originating at said annular groove.

If the thick-layer side is located on the side of the satellite shafts facing away from the enveloping housing, as mentioned, the thin layers on the outside can be gassed or degassed in a comparatively convenient way. For this purpose at least one gassing or degassing port can be formed on the housing in the area of the processing means, said port communicating with connecting means for a vacuum or overpressure source. Particularly favorable conditions result if this port is formed as a narrow slot extending over at least some satellite shafts perpendicular to the satellite shafts all around the housing enveloping the satellite shafts.

To obtain favorable flow conditions one can form the slot as a skewed slot opening toward the outlet side and limited by walling portions that enclose, with the axis of the central shaft, an acute angle pointing toward the outlet side.

On the outside of the housing one then provides a gassing or degassing chamber in which the slot opens and on which the connecting means for the vacuum or overpressure source are disposed. This gassing or degassing chamber is expediently disposed approximately in the center between the inlet and outlet sides of the satellite shafts or of satellite shaft portions.

The drawing shows embodiment examples of the object of the invention.

Figure 2:
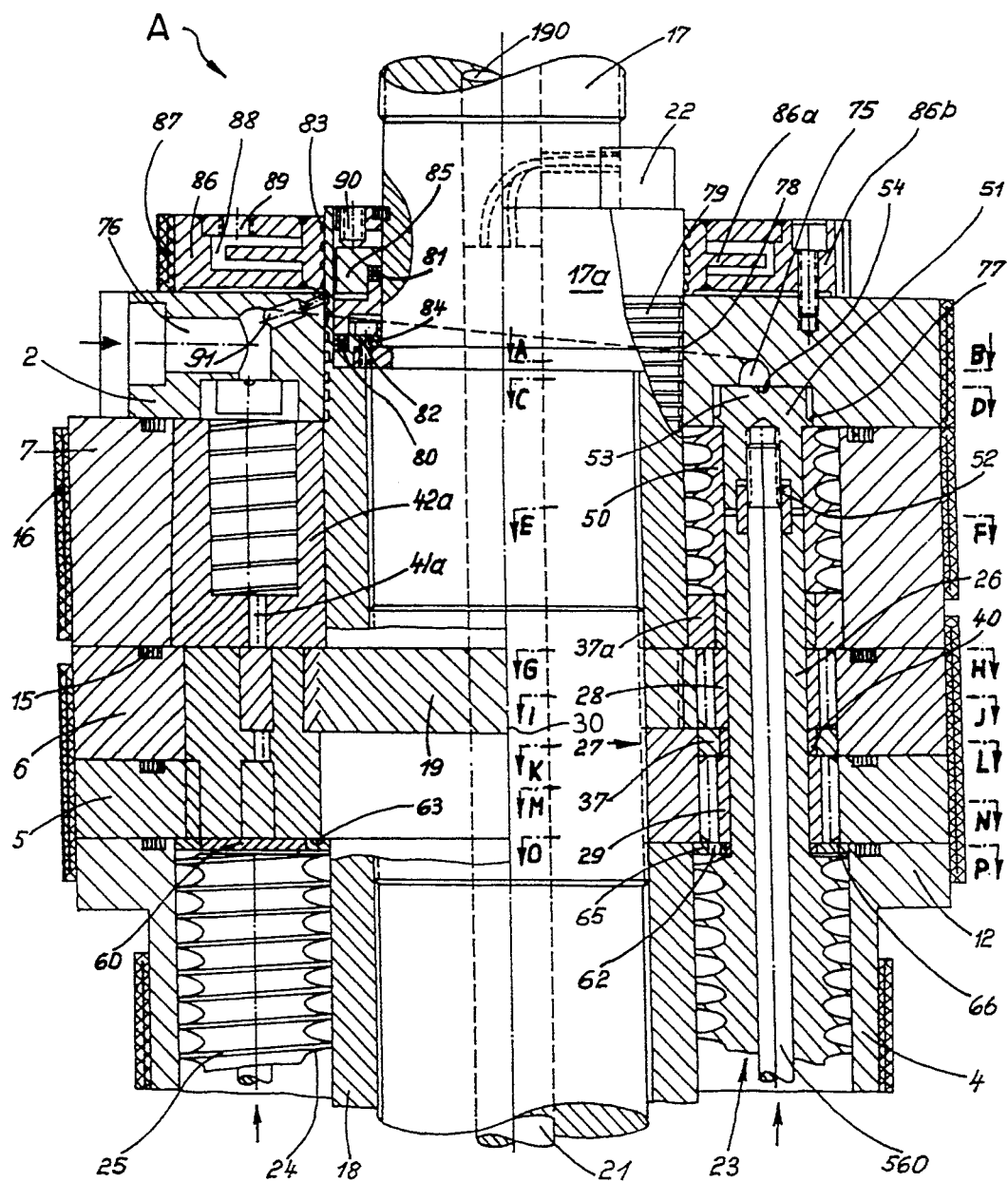
Figure 3:
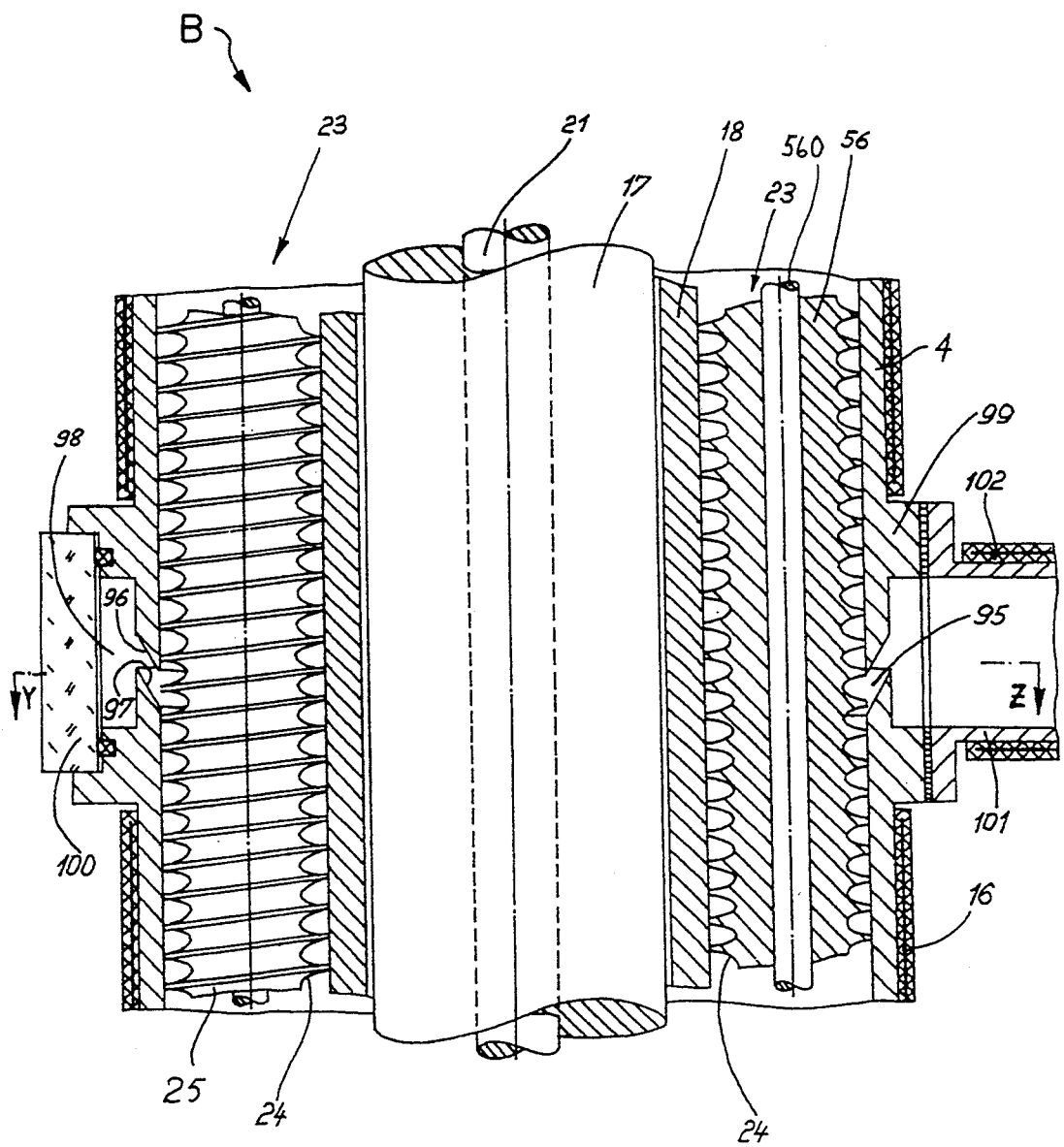
Figure 4:
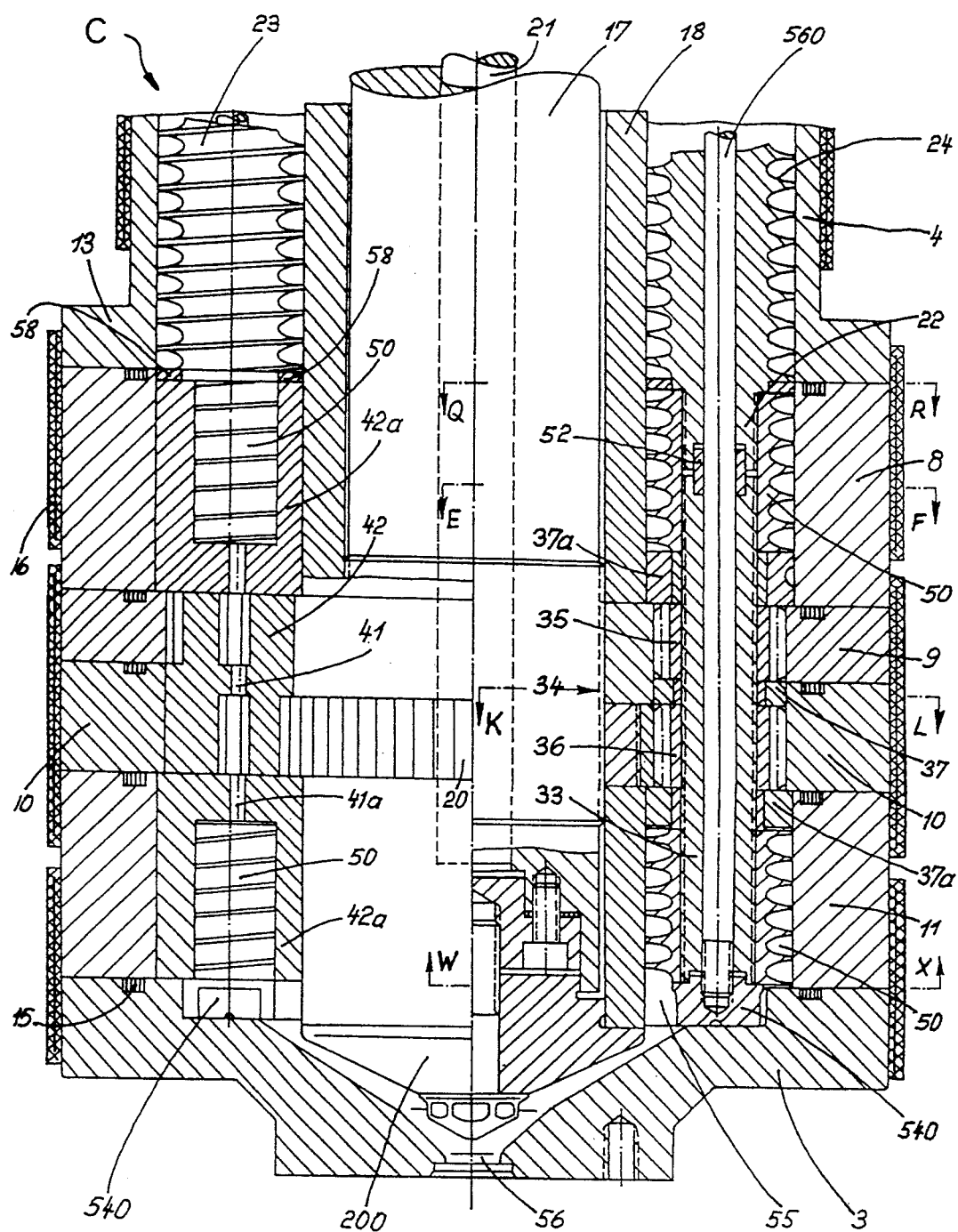
Figure 5:
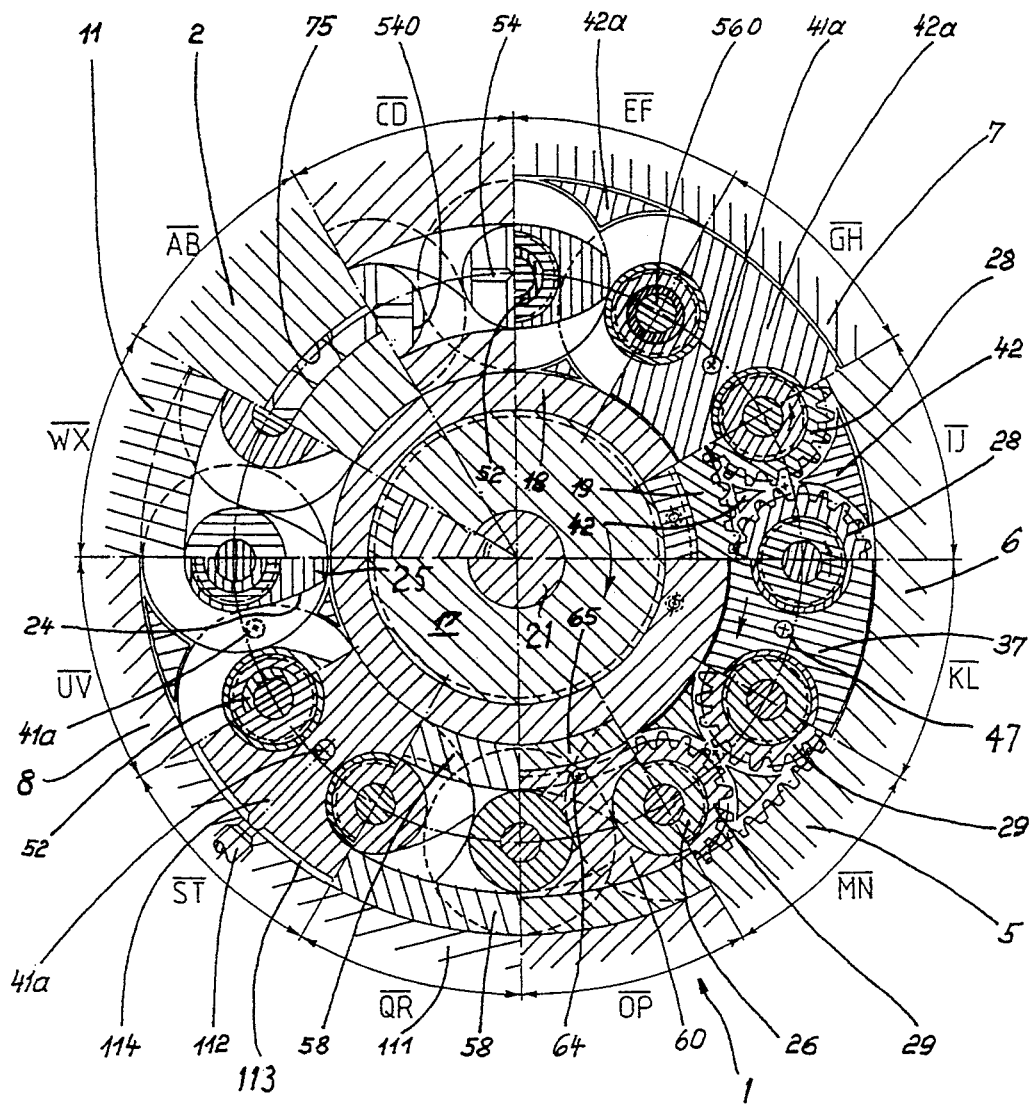
Figure 6:
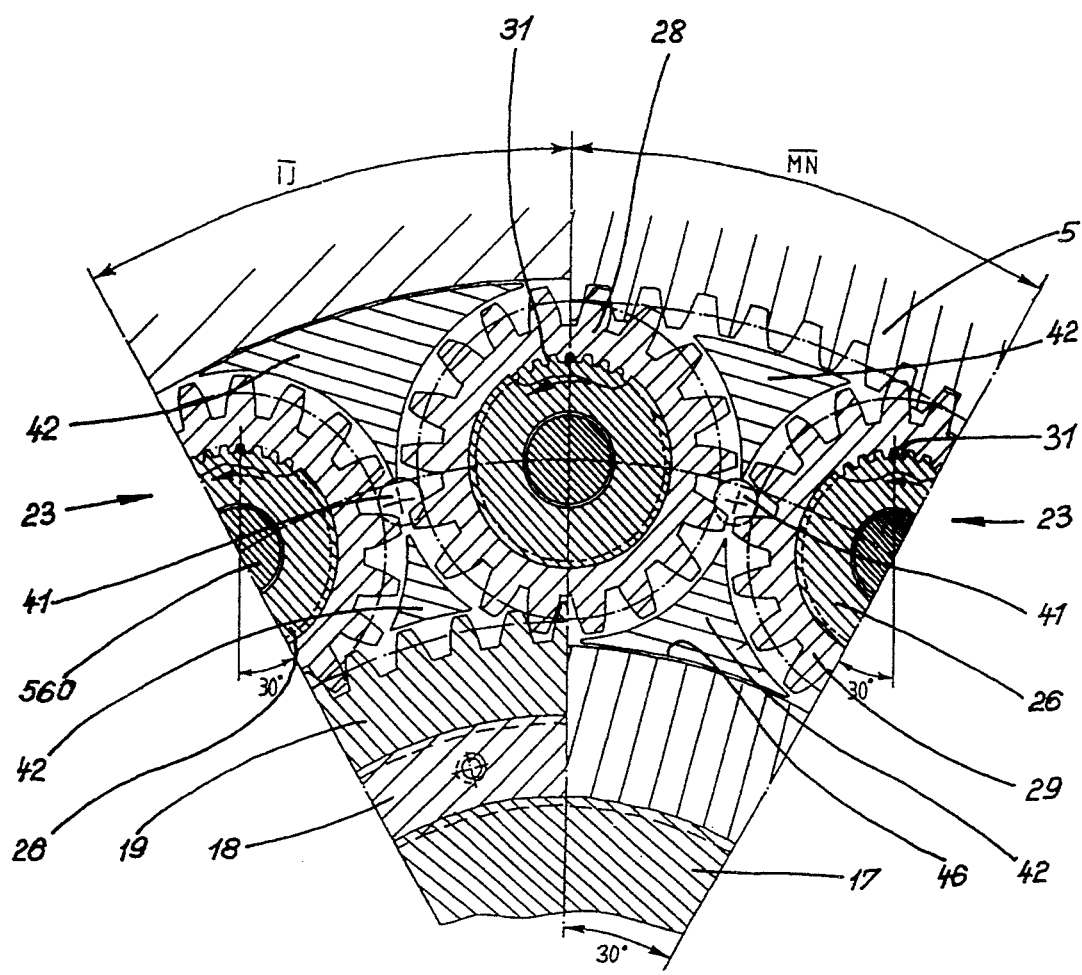
Figure 7:
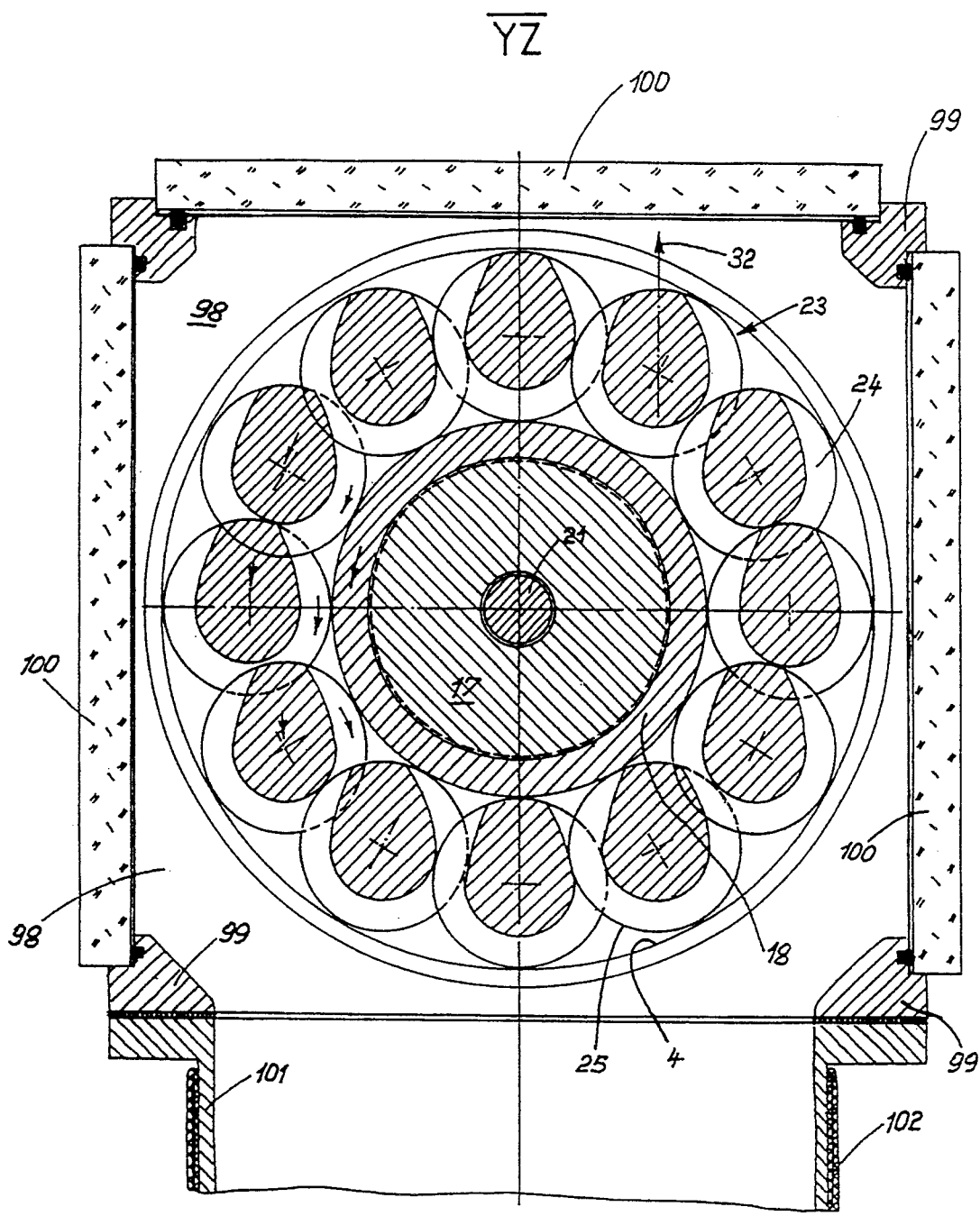
Figure 8:
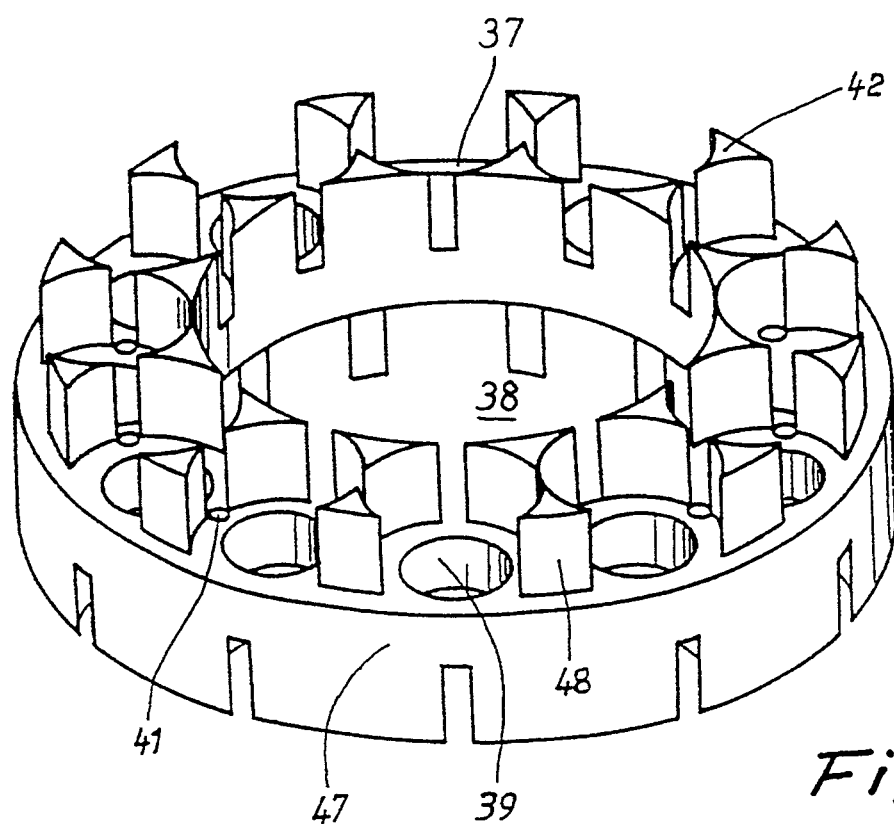
Figure 9:
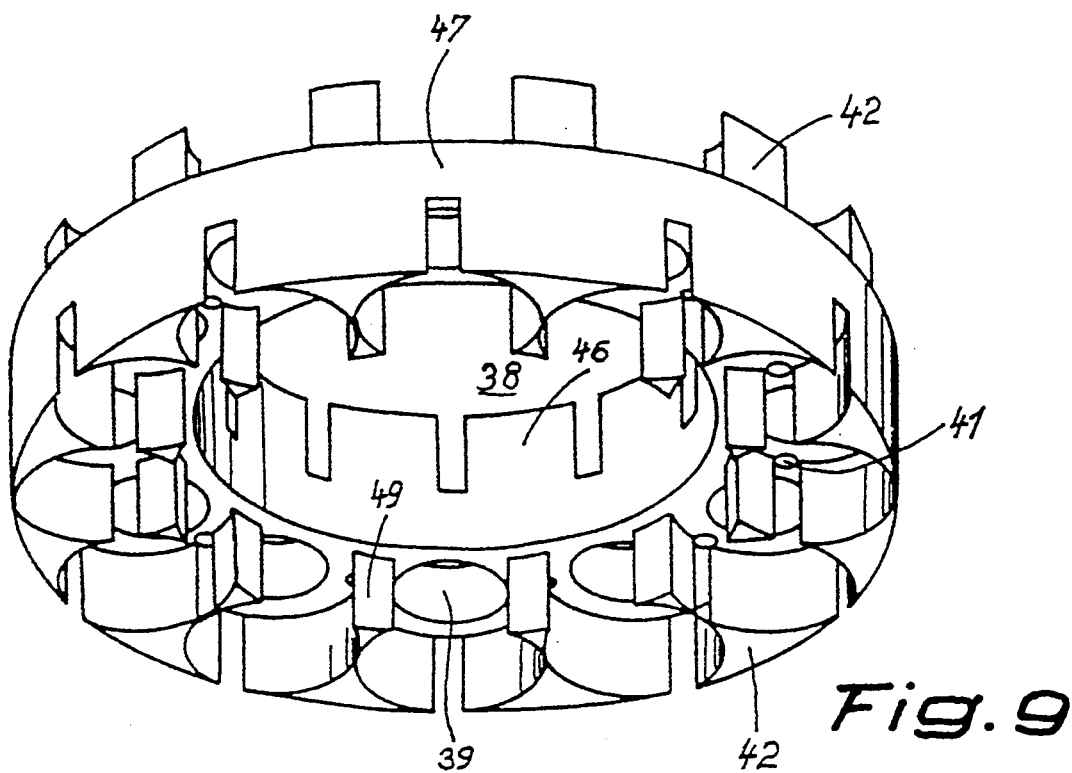
Figure 10:
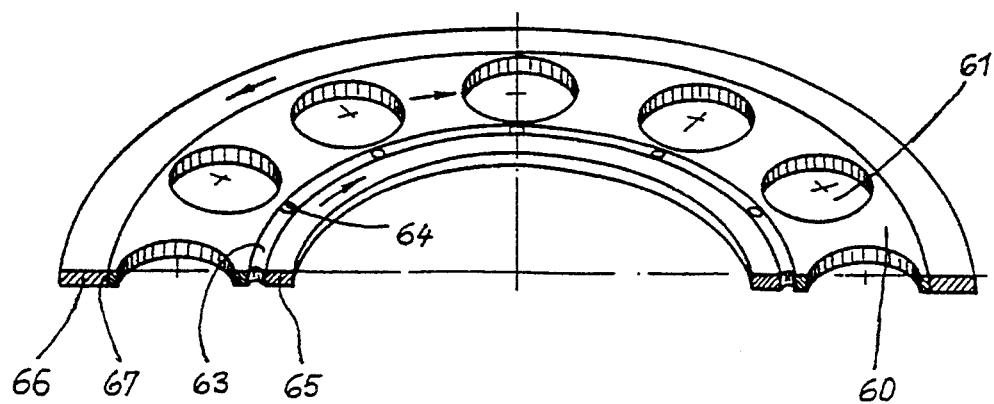
Figure 11:
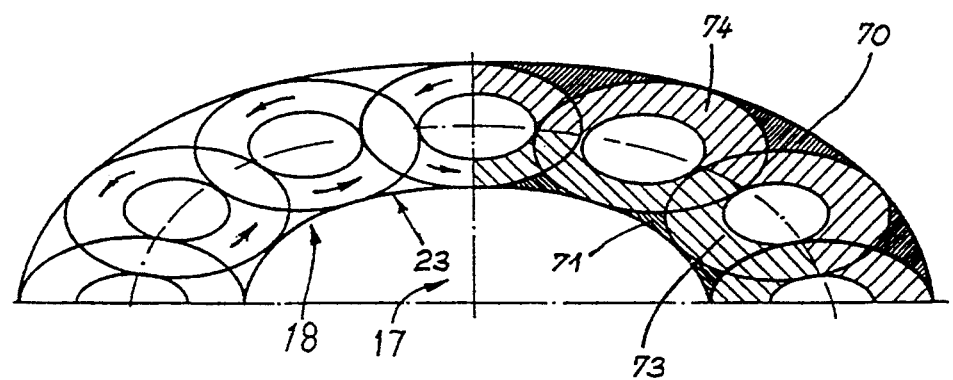
Figure 12:
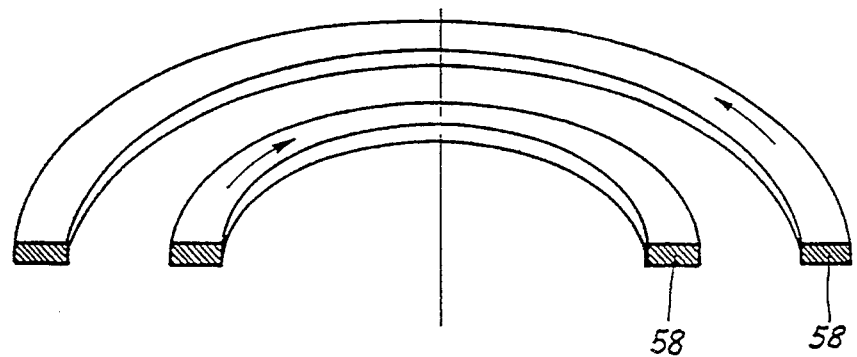
Figure 13:
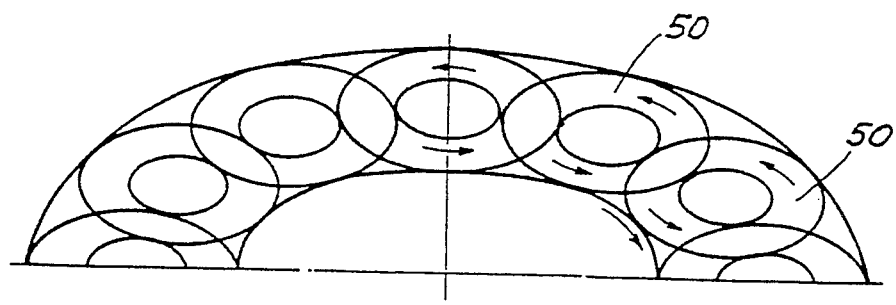
Figure 14:
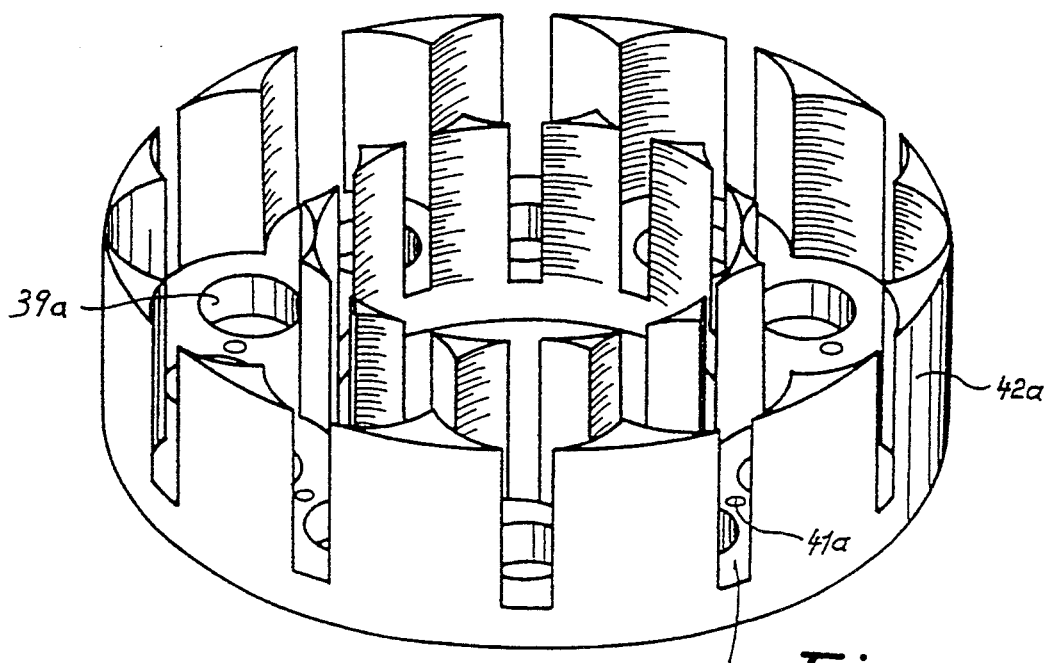
Figure 15:
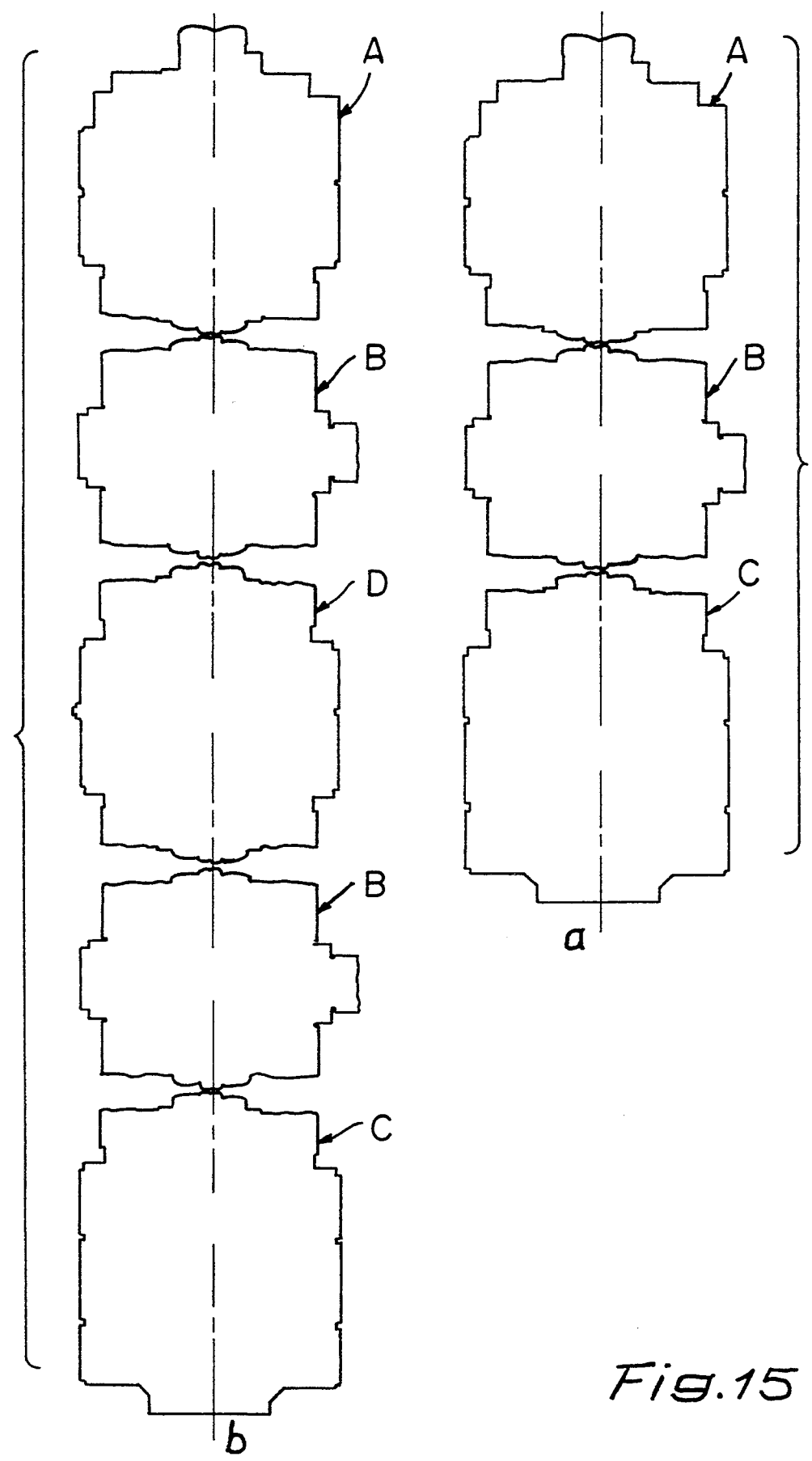
Figure 16:
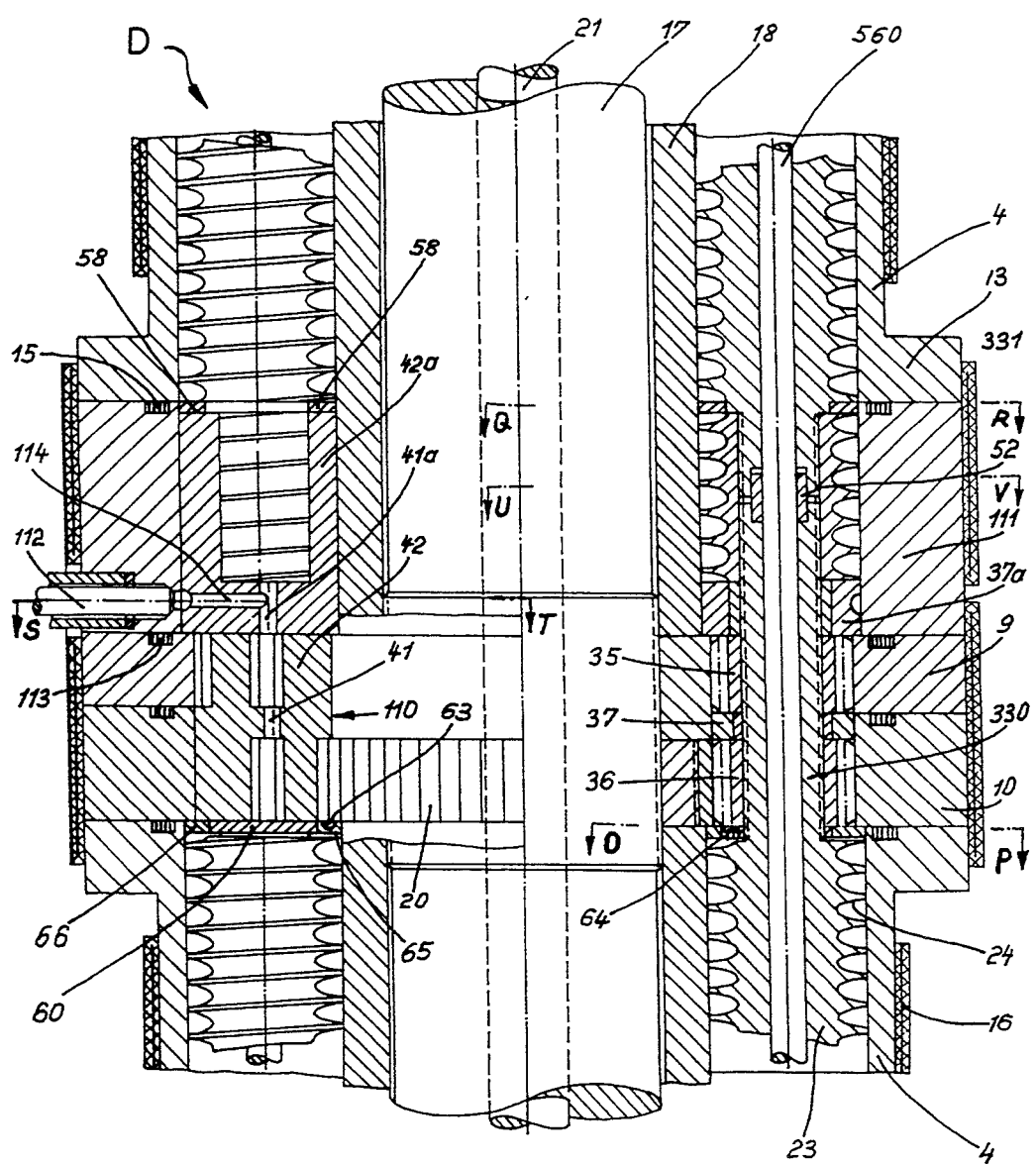

FIG. 1 shows a detail of an apparatus according to the invention in axial cross section from the side, FIG. 2 shows a portion of the apparatus of FIG. 1 on the inlet side of the material to be processed in a cross-sectional view according to FIG. 1 and on a different scale, FIG. 3 shows the intermediate portion of the apparatus of FIG. 1 illustrating the degassing chamber in a corresponding representation and on a different scale, FIG. 4 shows the portion of the apparatus of FIG. 1 on the outlet side of the material to be processed in a corresponding cross-sectional view and on a different scale, FIG. 5 shows the apparatus of FIG. 1 in cross section from the top illustrating in sectors the particular cross-sectional views on various cutting lines AB to WX of the apparatus of FIGS. 2, 3, 4, 16, FIG. 6 shows a detail from the representation of FIG. 5 illustrating the serration, on a different scale, FIG. 7 shows the apparatus of FIG. 1 cut along line YZ in FIG. 3 from the top and on a different scale, FIGS. 8 and 9 show a baffle plate of the apparatus of FIG. 1 in perspective and from above and below, FIG. 10 shows the distributing plate of the apparatus of FIG. 1 with the corresponding sealing disks in a perspective partial view and on a different scale, FIG. 11 shows a perspective schematic detail of the wedge areas between the satellite shafts, the central shaft and the surrounding housing on a scale corresponding to FIG. 9, FIG. 12 shows two cleaning plates of the apparatus of FIG. 1 in a perspective partial view, FIG. 13 shows a schematic representation of the frictionally engaged drive conditions for the cleaning plates of FIG. 11, FIG. 14 shows a baffle plate of the apparatus of FIG. 1 with one-sided packings in perspective and on a different scale, FIG. 15 shows two different embodiments of the apparatus of FIG. 1 with a different number of axially joined processing areas, each in axial cross section and from the side, and FIG. 16 shows an intermediate portion of an apparatus according to FIG. 13 provided with a radial bedding of the satellite shafts, in axial cross section from the side and on a different scale.

The apparatus shown in FIG. 1 serves to homogenize and gas or degas a viscous liquid or mass, for example a molten high-molecular polymer mass. It has cylindrical housing 1 which can be disposed horizontally or vertically and is sealed vacuum-tight by cover plate 2 on the inlet side of the material to be processed and by cover 3 on the outlet side of the material. It comprises cylindrical housing jacket 4 followed on the inlet side by coaxial internal toothed first annular gear 5, coaxial spacer ring 6 and housing ring 7 on which cover plate 2 is placed.

On the outlet side housing jacket 4 is connected with second housing ring 8 which is followed by second internal toothed annular gear 9, then second spacer ring 10 and then third housing ring 11 which borders on cover 3. Rings 5, 6, 7 on the inlet side and 8, 9, 10, 11 on the outlet side are braced in the correct position together with cover plate 2 or cover 3 by axially parallel tie rods (not shown) with each other and with corresponding end flange 12 or 13 of housing jacket 4. Seal rings disposed on the interfaces, as indicated by way of example at 15, ensure a vacuum-tight seal. Electric heating elements 16 placed on the outside of the housing permit housing 1 to be heated from the outside, the axial subdivision of heating elements 16 into portions permitting a different control of the supply of heat over the axial length of the apparatus. However all housing portions can also be formed with a double jacket to be tempered with thermal oil.

Coaxial central shaft 17 is rotatably mounted in the housing. It bears cylindrical shaft jacket 18 extending between a pair of central gearwheels 19, 20 connected with central shaft 17 so as to rotate therewith, one being disposed in the area of spacer ring 6 on the inlet side and the other in the area of spacer ring 10 on the outlet side.

Central shaft 17 is formed as a hollow shaft with through bore 190 which is sealed vacuum-tight by screw cap 200 on the outlet side and contains an electric rod heater indicated at 21 whose main feed line is led through onto slip rings 22 on the inlet side.

Twelve axially parallel satellite shafts 23 surrounded by the housing are disposed in a ring about central shaft 17 in the way apparent in particular from FIGS. 5, 7. In the embodiment example shown they are each of multi-part design and bear processing means in the form of spirals 24 over a portion of their longitudinal extent corresponding approximately to the length of housing jacket 4. Instead of spirals 24 satellite shafts 23 could also be equipped with other processing tools, for example in the form of kneading plates as are known from DE-C 3 030 541. Combinations of different processing tools with each other and with spirals are also possible.

The diameter of spirals 24 is selected such that ridges 25 extend with a small working gap of about 0.4 mm as far as the inside wall of cylindrical housing jacket 4 on the outside, on the one hand, and as far as cylindrical shaft jacket 18 on the inside, on the other hand. The working annular gap is selected to be so small that an effective axial seal is present on housing jacket 4 and shaft jacket 18 during operation.

Placed on cylindrical portion 26 of satellite shaft 23 on the inlet side is pair of pinions 27 comprising pinions 28, 29 which are connected positively with particular satellite shaft 23 so as to rotate therewith.

Upper pinion 28 located on the inlet side of the material to be processed in FIG. 2 engages central gearwheel 19, while second pinion 29 meshes with the internal toothing of annular gear 5 fixed on the housing. As indicated in FIG. 2, pinions 28, 29 bear a helical toothing with an opposed pitch, associated with a corresponding helical toothing on central gearwheel 19 or annular gear 5.

The two opposed helical toothings on pinions 28, 29 of pair of pinions 27 together form a double helical toothing. They cause axial forces acting on central shaft 17 and satellite shafts 23 to be removed via the toothings directly into annular gear 5 fixed on the housing, as indicated in FIG. 2 by a path shown at 30 for the flux of the axial and radial forces. At the same time satellite shafts 23 are automatically centered radially by these toothings, while central shaft 17 with central gearwheel 19 is likewise mounted radially via pinions 28, 29 on annular gear 5 fixed on the housing. No separate radial or axial bearings are therefore necessary in the area of housing cover 2 for central shaft 17 and/or satellite shafts 23.

Helical toothings of pinions 28, 29 of pair of pinions 27 are designed with different modules which are selected so as to result in each case in optimal engagement conditions with the spur toothing of central gearwheel 19 or the internal toothing of annular gear 5. The modules are selected so that an integral number of teeth results on central gearwheel 19 or on the internal toothing of annular gear 5 from satellite shaft 23 to satellite shaft 23. This is illustrated in FIGS. 5, 6 in the sectors corresponding to sections IJ and MN: the toothing portion located between two adjacent satellite shafts 23 has five teeth with central gearwheel 19 and eight teeth on annular gear 5.

For rotationally firm positive connection of pinions 28, 29 with particular satellite shaft 23 the latter is provided in cylindrical area 26 with axial serration 31 (FIG. 6) which engages a corresponding internal serration on the two pinions. The module of serration 31 is selected so as to result in an angular pitch of the toothing whose integral multiple corresponds to the angular pitch between two adjacent satellite shafts 23. In the present case the angular pitch between two adjacent satellite shafts 23 is 30° (360°: 12 shafts), while the angular pitch of serration 31 with 36 teeth is 10°.

Since spirals 24 of satellite shafts 23 can be double, by the way, the number of teeth of serration 31 must additionally be divisible by four.

The explained design of serration 31 and the pinion toothings permits pinions 28, 29 to be slipped on serration 31, during assembly, in an angular position relative to satellite shafts 23 such that individual satellite shafts 23 always maintain their correct mutual spatial association when revolving about central shaft 17, as apparent from FIG. 7. That is, the radial reference axis of spirals 24 indicated at 32 in FIG. 7 retains its spatial alignment. This ensures properly invariable precise engagement conditions for adjacent spirals 24 in each case. At the same time one can use pinions 28, 29 of like design for all satellite shafts 23, merely slipping them on serration 31 of satellite shafts 23 (which are also of like design) in a different angular position.

As seen in particular in FIG. 4, second pair of pinions 34 is placed on cylindrical end portion 33 of satellite shafts 23 on the outlet side of the material to be processed. This pair comprises coaxial pinions 35, 36 which are for example coupled positively with the particular satellite shaft via a serration corresponding to serration 31 (FIG. 6). Pinions 35, 36 bear a spur-toothing for engaging a corresponding spur toothing on the inside of annular gear 9 or on the outside of central gearwheel 20.

The spur toothings permit a certain axial mobility of satellite shafts 23 and central shaft 17 in this outlet area so that, for example, slight temperature-induced changes in the length of these shafts are compensated without obstruction. At the same time central shaft 17 and satellite shafts 23 are mounted via pinions 35, 36 radially on annular gear 9 fixed on the housing so that it is also unnecessary to dispose separate axial or radial bearings in cover 3 on the outlet side of the material to be processed.

Between pinions 28, 29 of first pair of pinions 27 and between pinions 35, 36 of second pair of pinions 34 there is in each case baffle plate 37, whose structure can be seen in particular from FIGS. 8 and 9.

Circular cylindrical baffle plate 37 is formed as a ring plate with coaxial cylindrical opening 38 which surrounds shaft jacket 18 with a narrow annular gap and extends on its outer circumference likewise with a narrow gap as far as the inner surface of spacer ring 6 (FIG. 2) or 10 (FIG. 1). It is provided with axially parallel cylindrical through bores 39 through which cylindrical portions 26 or 33 (FIGS. 2, 4) of the satellite shafts extend. Inserted internal serrated ring bearings 40 (FIG. 2) seal serration 31 (FIG. 6) and result in proper motional conditions relative to the inside walling of bores 39.

Axially parallel flow channels 41 for the material to be processed are bored axially centered between adjacent axial bores 39 on a common circle coaxial with central opening 38. As seen in particular in FIGS. 5, 6, flow channels 41 open between the disengaged toothings of pinions 28, 29 or 35, 36 (FIGS. 2, 4) of adjacent satellite shafts 23, approximately at or near the place where the pinion toothings of adjacent satellite shafts approach each other furthest.

Upright, axially parallel packings 42 are formed on the top and underside of baffle plate 37, their faces lying in a common horizontal plane and the packings being laterally limited substantially by intersecting, axially parallel cylindrical surfaces. Packings 42 have a cross section such that they largely fill the wedges present on each side of flow channels 41 between the toothings of the pinions of pairs of pinions 28, 29 or 36, 37 and corresponding central gearwheel 19 or 20 as well as corresponding annular gear 5 or 9 fixed on the housing (FIGS. 2, 4). For this purpose packings 42 extend as far as the circumferential surface of central shaft 17 at 46 so as to form a narrow annular gap, as briefly explained for example with reference to FIG. 2, while at 47 they likewise seal with a cylindrical surface so as to form a narrow annular gap from the inside cylindrical surface of spacer ring 6. At 48, 49 the corresponding cylindrical surfaces of packings 42 are set back radially to make room for the toothing of central gearwheel 19 or annular gear 5.

The same applies to baffle plate 37 inserted in second pair of pinions 34 (FIG. 4).

Baffle plate 37 firstly has the function of ensuring a regular controlled flow of material to be processed through particular pair of pinions 27 or 34. Secondly, it prevents material from collecting in the areas between the pinions of central shaft 17 and the outer surrounding housing portions, which is not conveyed further and thus solidifies, thereby jeopardizing the reliability of the whole apparatus in the course of time.

In the direction of flow of the material to be processed pairs of pinions 27, 34 are preceded for each satellite shaft 23 by a conveying member in the form of screw conveyor 50 which is placed on serration 31 of the shaft so as to rotate therewith. Screw conveyor 50 is formed as a worm sleeve into which corresponding serrated end piece 51 protrudes on the inlet side, said end piece being centered by guide bush 52 relative to cylindrical portion 26 of particular satellite shaft 23 and bearing on cylindrical head portion 53 distributing grooves 54 disposed in a cross (FIG. 5 section according to sector CD).

The constructional design on the outlet side of the material to be processed is fundamentally similar, as apparent from FIG. 4. The guide bush is again referred to as 52. The assembly is only such that second screw conveyor 50 is placed on each satellite shaft 23 behind pair of pinions 34 in the direction of flow for conveying the processed material into outlet channel 55 leading to central discharge opening 56 in cover 3.

Each satellite shaft 23 is formed as a hollow shaft; it contains continuous tie rod 560 that is screwed to end pieces 51, 540 and braces the whole thing into a uniform shaft.

Screw conveyor 50 of each satellite shaft has associated baffle plate 37a that is shown in FIG. 14 and has fundamentally the same structure as baffle plate 37 (FIGS. 8, 9). The only difference is that packings 42a are disposed only on one plane side of baffle plate 37a. Packings 42a are designed with their intersecting cylindrical surfaces limiting them laterally in such a way as to surround screw conveyors 50 substantially over their axial extension, as indicated in FIGS. 2, 4. Flow channels 41a for the material to be processed located on a common coaxial circle axially centered between through bores 39a for cylindrical portions 33 of satellite shafts 23 conduct the particular material conveyed by screw conveyors 50 either to pinions 28, 29 of first pair of pinions 27 or to pinions 36, 37 of second pair of pinions 34. Only packings 42a surrounding end screw conveyor 50 placed on particular satellite shaft 23 on the outlet side point toward outlet channel 55, so that material flows through baffle plate 37a in the reverse direction here in comparison to the conditions with baffle plate 37a preceding pair of pinions 34.

Baffle plate 37a preceding pair of pinions 34 on the outlet side results in the necessary back pressure for treatment of the material by spirals 24, while packings 42a of baffle plates 37a fill the wedge spaces between central shaft 17 and the housing as well as the toothings present in this area, in the way explained above, in order to avoid clearance spaces in the flow path of the material.

Two coaxial cleaning rings 58 are placed on packings 42a of baffle plate 37a preceding pair of pinions 34 on the outlet side. Inner cleaning ring 58 is rotatably mounted on the circumferential surface of shaft jacket 18, and the outer cleaning ring of greater diameter on the inside surface area of housing jacket 4 (FIGS. 4, 12).

As indicated by the sketch in FIG. 13, cleaning rings 58 are driven in frictional engagement in the opposite sense of rotation when satellite shafts 23 revolve about central shaft 17 because they are coupled by frictional engagement with screw conveyors 50 on the outside or inside of the rotational axis of the particular satellite shaft. The function of cleaning rings 58 is to eliminate clearance spaces in the areas of the transition between spirals 24 and screw conveyors 50 or packings 42a of baffle plate 37a, and to ensure continuous automatic cleaning of the faces of packings 42a.

Screw conveyors 50 preceding pair of pinions 34 on the outlet side are dimensioned so as to overcome the resistance to flow of the two succeeding baffle plates 37a and of pair of pinions 34.

On the inlet side pair of pinions 27 is succeeded in the direction of flow by tripartite distributing plate 60 whose structure is seen in particular in FIG. 10.

Distributing plate 60 formed as a ring plate has a number of through bores 61 lying on a common coaxial circle corresponding to the number of satellite shafts 23 for mounting it with little play on cylindrical collar 62 (FIG. 2) of each satellite shaft 23.

In the space surrounded by the circle of through openings 61 there is coaxial annular groove 63 opening upward from the plane surface, where for each through bore 61 side bore 64 originates lying on the same radius therewith and leading as a through bore to the back of distributing plate 60. Annular groove 63 is limited on the radial inside by cylindrical inner seal ring 65 which is mounted in freely rotatable fashion on shaft jacket 18 and limits a narrow bearing gap on the other circumferential side with annular groove 63.

Second outer seal ring 66 is placed with little bearing play on outer cylindrical circumferential surface 67 of distributing plate 60. It borders likewise with little play on the cylindrical inner surface of housing portion 4.

When satellite shafts 23 revolve about central shaft 17 seal rings 65, 66 perform a rotary motion in opposite directions as indicated by arrows in FIG. 10, which is imparted to them by frictionally engaged drive from the faces of the satellite shafts bearing spirals 24. The rotary motion in opposite directions comes about in the way clear from FIG. 11, which also shows that the two seal rings cover inner and outer wedge areas 70, 71 between the housing and shaft jacket 18 as well as adjacent satellite shafts 23.

As seen in particular from FIG. 2, the arrangement of side bores 64 on the inside of through bores 61 of distributing plate 60 causes the side bores to open directly within the particular satellite shaft onto spirals 24. This ensures a proper, precisely defined supply of material into the inside working chamber of each satellite shaft referred to as 73 in FIG. 11, this working chamber being limited by shaft jacket 18 and spirals 24 of adjacent satellite shafts 23 as well as particular satellite shaft 23 itself. During operation the so-called thick-layer side therefore lies in the area of inner working chambers 73.

Located opposite inner working chambers 73 is outer working chamber 74 defined for each satellite shaft 23, being limited by housing jacket 4, spirals 24 of adjacent satellite shafts 23 and particular satellite shaft 23 itself. In outer working chambers 74 the material to be processed is spread into thin layers, during operation, on the faces of spirals 24 so that it is accessible to effective gassing and degassing, while at the same time being excellently homogenized and mixed when successively and repeatedly passing through the narrow gaps between spirals 24 of adjacent satellite shafts. The side associated with outer working chambers 74 is therefore the so-called thin-layer side of the ring of satellite shafts or the whole apparatus.

The material to be treated is supplied to the treating means formed by spirals 24 on satellite shafts 23 via feeding means formed in cover plate 2 (compare FIGS. 1, 2). These feeding means contain ring channel 75 disposed in cover plate 2 coaxially with central shaft 17 and having a continuously decreasing axial height along its length starting from laterally disposed radial feed channel 76 for the material. Ring channel 75 opens into annular groove 77 coaxial therewith which receives end pieces 51 of satellite shafts 23 with lateral play. During operation, satellite shafts 23 are therefore also embedded in the area of screw conveyors 50 on their faces in the material, which can flow to the spirals of screw conveyors 50 via laterally disposed grooves 77 on particular end piece 51. Grooves 54 disposed on the faces improve the distribution of material and prevent material from being deposited on the faces of end pieces 51.

Screw conveyors 50 are dimensioned so as to overcome the resistance to flow which the material to be treated meets in baffle plates 37, pair of pinions 27 and distributing plate 60.

Since central shaft 17 and satellite shafts 23 are mounted axially and radially via pairs of pinions 27, 34 no separate axial bedding is provided for this purpose in the area of cover plate 2. Central shaft 17 passes through central cylindrical bearing opening 78 in cover plate 2 whose diameter is selected so that it limits a thin bearing gap with the cylindrical outside wall of shaft jacket 18. In the area of bearing bore 78 conveying thread 79 is applied to the outside of bearing jacket 18, protruding axially into the area of screw conveyors 50 on satellite shafts 23 and having a pitch such that it constantly conveys, during operation, a certain amount of material in the axial direction through the bearing gap surrounding it in cover plate 2. This free-flowing material filling the bearing gap seals the interior of the housing vacuum-tight from the outside.

To avoid vacuum losses through the annular gap between central shaft 17 and shaft jacket 18, shaft jacket 18 is also sealed by two fitted seal rings 80, 81 against cylindrical journal 17a of central shaft 17. The two seal rings 80 are braced axially by pressure screws 82, 83 acting on corresponding thrust rings 84, 85.

Finally, heatable coaxial cooling ring 86 is placed on the outside of cover plate 2, generally consisting of a very thermoconducting metal and bearing heating element 87 on its outer circumferential surface. Cooling ring 86, which is bipartite for manufacturing reasons, has a coaxial ring channel limited therein into which coolant connection 89 leads and which is limited on the radial inside by cooling ring member 86a welded in liquid-tight fashion to outside cooling ring member 86b. Embodiments are conceivable in which cooling ring members 86a, b are made of different materials in such a way that only inside cooling ring member 86a is very thermoconducting.

In the area of its inside wall surrounding shaft jacket 18 with bearing play, cooling ring 86 is provided with annular grooves 90 opening on the shaft side.

From ring channel 75 at least one side channel 91 branches off to open in cover plate 2 in the area of bearing bore 78 in the direct vicinity-of cooling ring 86 and serving to bring free-flowing material from ring channel 75 into the bearing gap between cooling ring 86 and bearing bore 78 in cover plate 2 and shaft jacket 18.

Corresponding control of heating element 87 and the exposure to coolant at 89 hold cooling ring 86 during operation at a temperature which is below the melting point of the material to be processed, thereby ensuring that the material filling the bearing gap can properly perform its function as sealing means.

Conveying thread 79 on shaft jacket 18 can also be supplied with material to be processed for purposes of rinsing from a side channel (not shown in FIG. 2) disposed opposite feed channel 76.

Between the two end portions on the inlet and outlet sides of the apparatus described with reference to FIGS. 2, 4 housing jacket 4 is disposed, bearing substantially in the middle gassing or degassing means which are illustrated in FIGS. 1, 3 and 7.

These gassing or degassing means have a gassing or degassing port which is disposed in the area of the processing means formed by spirals 24 and designed as circumferential skewed slot 95. This skewed slot opening toward the outside of housing jacket 4 is limited on both sides by conic walling portions 96, 97 which enclose an acute angle with the axis of central shaft 17 and are inclined toward the outlet side of the apparatus.

Skewed slot 95 opens on the outside into gassing or degassing chamber 98 surrounding housing jacket 4 (FIG. 3) and limited by housing portions 99 fastened to housing jacket 4 between which plane viewing glasses 100 are inserted in sealed fashion, resulting altogether in a square gassing or degassing space. On one side connecting sleeve 101 is fitted in sealed fashion instead of a viewing glass, being surrounded by electric heating element 102 and connected to a vacuum or overpressure source. Depending on the type of treatment for the material to be processed, it can also lead to a collecting container or a condenser.

The described apparatus works as follows.

The material to be processed, for example a high-molecular molten polymer mass, fed continuously into ring channel 75 via feed channel 76 at low pressure passes in the above-described way from ring channel 75 to screw conveyors 50 on the inlet side which convey the material through flow channels 41 of baffle plates 37 and pair of pinions 27 to distributing plate 60, from where the material is guided specifically onto the radial inside of each satellite shaft 23 via side bores 64.

The thick-layer side thus forms within radially inside working chambers 73 of threads 24 on satellite shafts 23, from where the material is continuously conveyed upon each revolution of the satellite shafts through the gaps between meshing threads onto the opposite radial outside, the thin-layer side, with working chambers 74 (FIG. 11).

The material conveyed in this way over the entire length of threads 24 is continuously subjected to a vacuum for example (if the material is to be degassed) on the outer thin-layer side via skewed slot 95 disposed approximately in the middle between the inlet and outlet sides. Since the vacuum acts on the material spread in a thin layer with a large surface area, an excellent degassing is obtained.

After the material passes through spirals 24 it is conveyed by screw conveyors 50 on the outlet side through baffle plates 37a and second pair of pinions 34 into outlet channel 55, from where it reaches further processing means via connection 56.

In the described embodiment the length of satellite shafts 23 is comparatively short (15× the diameter of the satellite shaft) in consideration of the necessary sojourn time of the material and the number of satellite shafts. Also, only one processing chamber is present, located between pairs of pinions 27, 34 in the area of spirals 24.

As shown by FIG. 15, which illustrates the described embodiment of FIG. 1 at a again for comparison, the apparatus can also be designed with a much greater axial length, whereby a plurality of treating or processing chambers separated from one another by their own pairs of pinions and baffle plates can also be disposed one axially behind the other.

Embodiments a, b thus show that a plurality of gassing or degassing means according to FIGS. 1, 3 can be provided over the length of the apparatus, each being equipped with its own gassing or degassing chamber 98 according to FIG. 6 and corresponding connecting sleeve 101. The corresponding portions of the apparatus are designed as illustrated in detail in FIG. 3.

Between two such portions each containing gassing or degassing chamber 98 the apparatus is divided by separate, preferably spur toothed pair of pinions 110 into separate treating portions or chambers which are disposed simply axially one behind the other. Central shaft 17 and satellite shafts 23 are simultaneously supported radially against housing jacket 4 so that a proper shaft bedding with no excessive sagging of the shafts also results when the apparatus is disposed horizontally.

As embodiments a and b of FIG. 15 show, one or more processing portions or chambers can thus be connected in series for example.

The constructional design of the intermediate portions of the apparatus each containing pair of pinions 110 is apparent from FIG. 16. It corresponds fundamentally to the formation of pair of pinions 34 as illustrated in FIG. 4.

Spur toothed central gearwheel 20 is placed on central shaft 17 so as to rotate therewith, meshing with spur toothed pinion 36 which is placed so as to rotate therewith on accordingly serrated cylindrical part 330 of a corresponding portion of satellite shaft 23. The other spur toothed gear 35 of pair of pinions 110 engages the internal toothing of annular gear 9 fixed on the housing with which adjacent spacer ring 10 is associated. Between pinions 35, 36 there is baffle plate 37 whose flow channels 41 are disposed as in FIG. 4.

Pair of pinions 110 is followed in the transport direction of the material by distributing plate 60 which is designed with two seal rings 65, 66 according to FIG. 10 and guides the material via side bores 64 in each case onto the inside, i.e. the thick side, of the following portions of satellite shafts 23. This results in the same material feed conditions for the particular processing portion following pair of pinions 110, as was already explained in detail for the first portion of the apparatus on the inlet side with reference to FIGS. 1, 2.

On the material feed side for pair of pinions 110 there is in each case baffle plate 37a surrounded by housing ring 111 which is mounted in sealed fashion between particular distance ring 9 and adjacent flange 13 of corresponding housing jacket 4. Packings 42a of baffle plate 37a each surround screw conveyor 50 which is placed on cylindrical portion 331, provided with serration 31, of the preceding portion of satellite shaft 23. Guide bush 52 effects mutual centering of the two coaxial satellite shaft portions adjacent on the face.

The inflowing material from the preceding portion of particular satellite shaft 23 (on the top in FIG. 16) comes past cleaning plates 58 according to FIG. 12 into the area of screw conveyors 50, from where it passes through flow channels 41a to pair of pinions 110. After flowing through pair of pinions 110 the material is guided, as explained above, through distributing plate 60 onto the thick-layer side of the lower portion of satellite shaft 23.

Housing ring 111 has radial feed channel 112 formed therein which is connected with flow channels 41a of individual satellite shaft 23 in baffle plate 37a via ring channel 113 formed on the outside of baffle plate 37a and side channels 114 originating at ring channel 113. Feed channel 112 thus opens into the area before pair of pinions 110; it permits additive substances or materials to be introduced into the following treating portion for conducting another treatment process, for example admixture of a third substance.

I claim:

1. An apparatus for continuously processing viscous liquids and masses, in particular molten plastic masses and high-molecular polymers, having a number of axially parallel satellite shafts disposed in a ring within a housing and driven in the same direction via associated pinions, said shafts bearing processing means engaging each other on adjacent satellite shafts and spreading the material to be processed in a thin layer in certain areas, a central shaft disposed in the center of the space surrounded by the satellite shafts and driven axially parallel to the satellite shafts, said central shaft bearing at least one driving gear so as to rotate therewith, the satellite shafts being coupled in geared fashion via their pinions with the central driving gear and with the internal toothing of at least one annular gear fixed on the housing in such a way that when the central shaft rotates the satellite shafts perform a common revolving motion about the central shaft, and feeding and removing means for introducing the material to be processed into the range of action of the processing means on the inlet side and removing it therefrom on the outlet side, characterized in that the satellite shafts (23) have associated therewith on the inlet side distributing means (60) for the material to be processed which communicate with the feeding means and have, in the area of the processing means (24) on all Satellite shafts, guiding means (64) for the material that open onto the thick-layer side located on the side of the satellite shafts (23) facing away from the enveloping housing (1).

2. The apparatus of claim 1, characterized in that the distributing means have a distributing plate (60) inserted after the pinions (28, 29) on the inlet side, said plate being provided with through bores (61) for the satellite shafts (23) and having the guiding means (64) formed thereon.

3. The apparatus of claim 2, characterized in that the distributing plate (60) has at least one annular groove (63) opening toward the inlet side and communicating with the feeding means, with channels (64) forming the guiding means originating at said annular groove.

4. The apparatus of claim 2, characterized in that two ring-shaped seal rings (65, 66) are disposed following the circular distributing plate (60) radially on both sides, being mounted in freely rotatable fashion coaxially with the central shaft (17), and the distributing plate (60) together with the seal rings (65, 66) substantially cover the areas (70, 71) between adjacent satellite shafts (23), the central shaft (17) and the housing (4).

5. The apparatus of claim 1, characterized in that at least one gassing or degassing port (95) is formed on the housing (4) in the area of the processing means (24), said port communicating with connecting means (101) for a vacuum or overpressure source.

6. The apparatus of claim 5, characterized in that the port is formed as a narrow slot (95) extending over at least some satellite shafts (23) perpendicular to the satellite shafts (23) all around the housing (4) enveloping the satellite shafts.

7. The apparatus of claim 6, characterized in that the slot is formed as a skewed slot (95) opening toward the outside and limited by walling portions that enclose, with the axis of the central shaft (17), an acute angle toward the outlet side.

8. The apparatus of claim 5, characterized in that a gassing or degassing chamber (98) in which the port (95) opens and on which the connecting means (101) are disposed is provided on the housing (4).

9. The apparatus of claim 5, characterized in that the port (95) is disposed approximately in the center between the inlet and outlet sides of the satellite shafts (23).

10. The apparatus of claim 1, characterized in that the central shaft (17) or a member (18) surrounding it is formed so as to extend radially as far as 0.1 mm to 0.7 mm from the processing means (42) on the satellite shafts (23).

11. The apparatus of claim 1, characterized in that the processing means are formed so as to extend as far as 0.1 mm to 0.7 mm from the inside wall of the housing or housing portion (4) surrounding it.

* * * * *